United States Patent Office 3,568,441
Patented Mar. 9, 1971

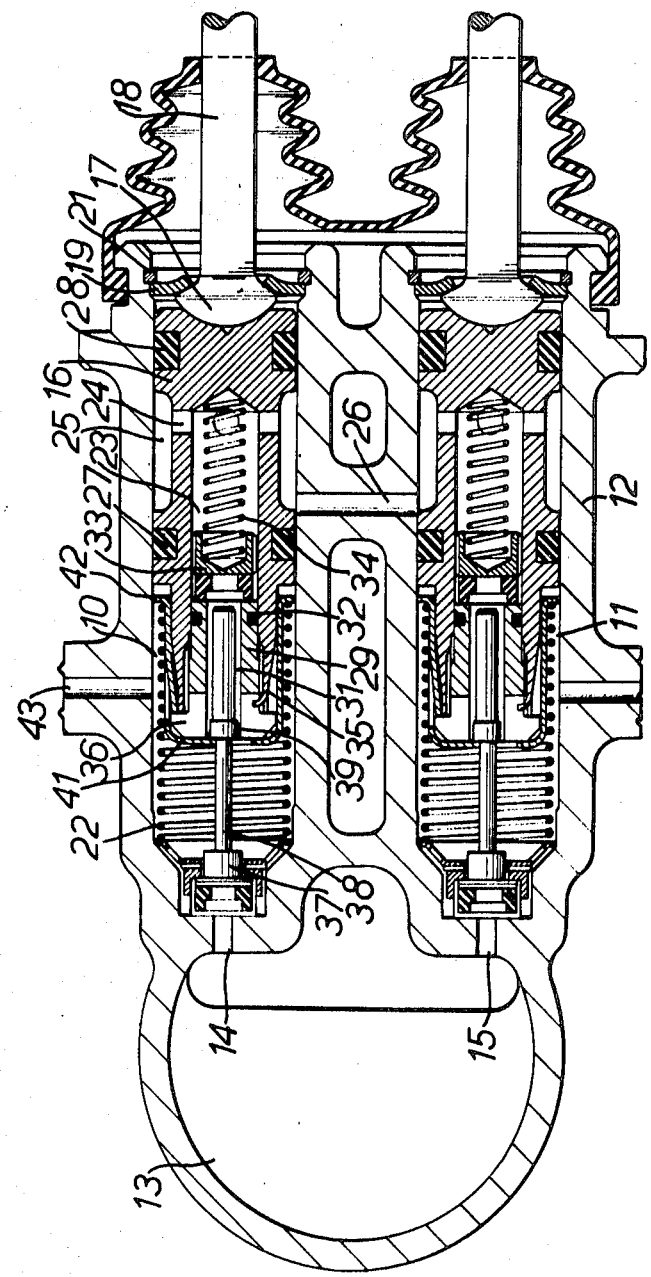

3,568,441
TWO PEDAL HYDRAULIC BRAKING SYSTEM
Stanley Walker, Birmingham, England, assignor to Girling Limited, Birmingham, England
Filed May 7, 1969, Ser. No. 824,380
Claims priority, application Great Britain, June 21, 1968, 29,600/68
Int. Cl. F15b 7/08
U.S. Cl. 60—54.5                    5 Claims

ABSTRACT OF THE DISCLOSURE

In a two-pedal hydraulic braking system in which brakes on wheels on opposite sides of a vehicle are applied by fluid from the pressure spaces of two master cylinders of which the pistons are actuated by separate pedals, cross compensation between the brakes on opposite sides of the vehicle is provided by a transfer passage communicating with the pressure spaces of the two cylinders through axial passages in the pistons controlled by normally closed transfer valves which are opened by movement of the pistons in the brake-applying direction.

---

This invention relates to a new or improved two-pedal hydraulic braking system of the kind commonly used on agricultural tractors and like vehicles in which brakes on opposite sides of the vehicle are applied by fluid from separate master cylinders each actuated by its own pedal.

The pedals can be operated simultaneously for retarding the vehicle or separately for steering.

Owing to the nature of the work done by the vehicle the linings of the brakes on one side of the vehicle wear more rapidly than those on the other side and to apply the brakes uniformly a greater volume of fluid has then to be displaced from one master cylinder than from the other.

To overcome this difficulty it is usual to provide some form of cross compensation, either mechanical or hydraulic.

According to our invention, in a braking system of the kind set forth the two master cylinders are connected by a transfer port or passage which is isolated from the pressure spaces of both cylinders by normally closed transfer valves which are located in axial passages in the pistons and are opened by movement of the pistons in the brake-applying direction.

When one pedal only is operated to advance the piston in one master cylinder the valve in that piston is opened after a short forward movement of the piston and the transfer port or passage is then in communication with the pressure space in front of the piston, but fluid cannot pass from that pressure space to the pressure space of the second cylinder as the transfer valve in the piston of the second cylinder remains closed.

If both pedals are operated simultaneously to advance the pistons in both master cylinders the transfer valves in both pistons are opened and fluid can pass freely from the pressure space of one cylinder to the pressure space of the other to compensate for uneven wear of the friction surfaces of the brakes on opposite sides of the vehicle.

In a preferred arrangement the transfer valve in each master cylinder is opened by the stem of a co-axial recuperation valve controlling a port in the end of the cylinder leading to a reservoir.

One form of dual master cylinder assembly embodying our invention is illustrated by way of example in the accompanying drawing which is a longitudinal section of the assembly.

The two cylinders are formed by parallel bores 10 and 11 in a common body or housing 12 incorporating an integral reservoir 13 with which axial ports 14, 15 in the forward ends of the bores communicate.

As the piston assemblies in the two cylinders are identical only one need be described.

The piston 16 is engaged at its rear end by a part-spherical head 17 on a pedal-operated push-rod 18. A stop for the head 17 is formed by an annular collar 19 located by a spring ring or circlip 21 received in an annular groove in the bore. The piston is normally held in the retracted position shown by a spring 22 located between the forward end of the piston and the forward end of the cylinder bore.

An axial passage 23 is drilled in the piston from its forward end for about two thirds of the length of the piston, and the rear end of this passage is in communication through radial ports 24 with an annular recess 25 of substantial axial length in the peripheral surface of the piston. The length of the recess is such that in all axial positions of the piston it is in communication through a transverse transfer port 26 with a corresponding recess in the piston of the other cylinder. The piston is provided with annular seals 27, 28 in front of and behind the recess 25.

Fitting into the forward end of the passage 23 is a plug 29 having an axial bore 31 and provided with a seal 32. The rear end of this plug provides a seat for a transfer valve 33 which is normally held closed by a spring 34 abutting between the valve and the closed rear end of the passage 23.

At its forward end the plug has an enlarged head 36 which abuts against the forward end of the piston and a diametrical slot is machined in the head.

The forward end of the piston is tapered off to a relatively small radial wall thickness, and after the plug has been inserted the reduced end of the piston is struck with a punch or other tool to deform at least one portion of it inwardly as a finger 35 engaging in the slot in the head to retain the plug in position.

The recuperation port 14 in the forward end of the cylinder is controlled by a standard axial valve 37 having an axially extending stem 38 on which there is an enlargement or shoulder 39 located on the rear side of a thimble 41 fitting over the forward end of the piston. A radially projecting flange 42 on the thimble provides the rear abutment for the piston return spring 22. The stem of the recuperation valve is extended rearwardly behind the shoulder 39 and its rear end is normally spaced a short distance from the transfer valve.

In the fully retracted position of the piston, as shown in the drawing, the engagement of the thimble 41 with the shoulder 39 holds the recuperation valve 37 open so that the pressure space in the cylinder in front of the piston and the brake cylinders fed from the outlet 43 are in direct communication with the reservoir.

When the piston is advanced by operation of the brake pedal a short forward movement is sufficient to cause the recuperation valve 37 to close so that pressure can be built up in front of the piston, and as the movement continues the rearwardly extending stem of the recuperation valve opens the transfer valve 33 against the action of the spring 34 and the pressure space is put into communication with the annular recess 25 and with the transfer port 26.

However, if the piston of the other cylinder has not been advanced the transfer valve in the piston of that cylinder remains closed and there can be no transfer of fluid between the pressure spaces of the two cylinders unless the pistons of both cylinders are advanced simultaneously by the operation of both pedals.

In the assembly described above the two master cylinders are combined with a common fluid reservoir to form a single unit but it will be appreciated that the system would be equally effective with individual master cylinders in which case the transfer passage 26 would be replaced by an external pipe or equivalent connection.

I claim:

1. In a two-pedal hydraulic braking system in which brakes on wheels on opposite sides of a vehicle are applied by fluid from the pressure spaces of two master cylinders of which the pistons are actuated by separate pedals and means are provided for allowing the transfer of fluid from one master cylinder to the other to compensate for uneven wear of the friction members of the brakes, the improvement comprising a transfer passage connecting the master cylinders and communicating with the pressure spaces of the cylinders through axial passages in the pistons which are controlled by normally closed transfer valves adapted to be opened by axial movement of the pistons in the brake-applying direction.

2. A two-pedal hydraulic braking system as in claim 1 wherein a recuperation port in the end of each master cylinder leads from the pressure space to a fluid reservoir and is controlled by a normally open axially movable recuperative valve which is closed by movement of the piston in the brake-applying direction, and the recuperation valve has an axially extending stem which engages and opens the transfer valve in the piston.

3. A two-pedal hydraulic braking system as in claim 1 wherein the transfer passage is at all times in communication with an annular recess in the periphery of the piston in each master cylinder and said recess is at all times in communication with the axial passage in the piston on the side of the transfer valve remote from the pressure space.

4. A two-pedal hydraulic braking system as in claim 1 wherein the two master cylinders and a fluid reservoir are combined as a unitary assembly having a common housing.

5. In a two-pedal hydraulic braking system comprising two master cylinders of which each master cylinder comprises a cylinder body having a bore, and a pedal-operated piston working in said bore to pressurize fluid in a pressure space defined within said bore in front of said piston, wherein connections are provided between said pressure spaces and brakes on wheels on opposite sides of a vehicle and means are provided for allowing the transfer of fluid from one master cylinder to the other to compensate for uneven wear of friction member of the brakes, the improvement comprising means defining a transfer passage connecting the said master cylinders, and a normally closed transfer valve located in an axial passage in each piston for isolating the transfer passage from each pressure space, said transfer valves being opened by simultaneous axial movement of said pistons in said bores.

References Cited
UNITED STATES PATENTS

| 3,064,434 | 11/1962 | Parrett | 60—54.6E |
| 3,345,112 | 10/1967 | Kershner | 60—54.5EX |
| 3,416,317 | 12/1968 | Shutt | 60—54.6E |
| 3,421,320 | 1/1969 | Kershner | 60—54.5E |

MARTIN P. SCHWADRON, Primary Examiner

R. BUNEVICH, Assistant Examiner

U.S. Cl. X.R.

188—152